Dec. 13, 1949  A. M. LEE  2,491,118
DEVICE FOR PROJECTING PULVERIZED MATERIAL
Filed May 9, 1946
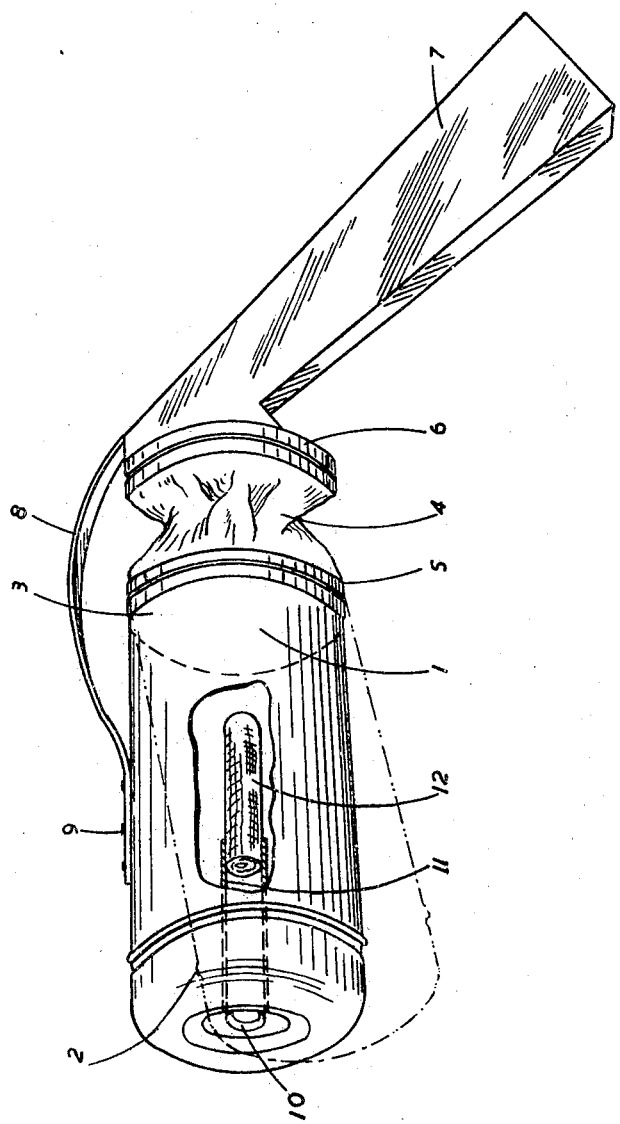
INVENTOR
ALBERT MILTON LEE
BY
ATTORNEY Patented Dec. 13, 1949

2,491,118

UNITED STATES PATENT OFFICE 2,491,118

DEVICE FOR PROJECTING PULVERIZED MATERIAL

Albert Milton Lee, Stanwell, England

Application May 9, 1946, Serial No. 668,578
In Great Britain July 18, 1945

3 Claims. (Cl. 43—146)

This invention relates to devices for projecting pulverised material, particularly insecticides for agricultural, horticultural and domestic use, of the kind comprising a casing associated with a bellows for supplying air to the casing to project the material therefrom.

A device of the kind described, according to this invention, comprises a casing which at one end is connected to and communicates with one end of a bellows, the other end of the bellows being secured to an operating handle about which the casing is oscillated to compress and extend the bellows to force air through the casing to effect the projection of the pulverised material from a delivery aperture in the casing, the weight of the casing and its contents being taken and its oscillatory displacement controlled by a leaf spring, preferably of curved or arcuate form, the respective ends of which are fixed to the handle and the casing.

An embodiment of the invention is illustrated in the accompanying drawing, wherein a perspective view of the device is shown.

In the embodiment illustrated in the drawing the casing 1 for containing the insecticide or other powder to be projected, is in the form of a tube of circular section, closed at the outer end by a detachable cap 2 and open at the inner end 3, around which is secured the outer end of a tubular bellows 4 formed from pliable material impervious to air, such as leather, the bellows being conveniently secured around the said end of the tube by any suitable means, such as an adhesive band 5. The other or inner end of the bellows is secured, conveniently in a similar manner, to a flange extending around the periphery of and at right angles to the plane of a disc 6, substantially equal in diameter to the exterior diameter of the said tube. To the outer face of the disc is secured the upper end of an operating handle 7, which is located conveniently with its longitudinal axis at about an angle of 30° of the plane of the said disc.

When the handle is held in the position shown in the drawing, the weight of the casing and its contents is supported by a leaf or strip spring 8, preferably of curved or arcuate form as shown in the drawing, one end 9 of which is secured to the upper portion of the outer surface of the casing, conveniently at a point about one quarter to one third of the length of the casing, from the inner or bellows end thereof, the spring curving upwardly from the upper surface of the casing, and over the bellows to the upper end of the operating handle to which the other end of the said spring is secured.

The strength of the said spring is such as normally to maintain the bellows fully or substantially fully extended and the said casing at its position of uppermost displacement relative to the operating handle, as shown in full lines in the drawing.

The arrangement is such that when the operator oscillates his hand gripping the operating handle the weight of the casing and its contents will flex the said spring and oscillate the casing about the upper end of the handle substantially between the positions of the casing shown in full and broken lines in the drawing. The said oscillation of the casing alternately compresses and expands the bellows to force air through the casing to effect the projection of its contents from a suitable discharge outlet 10.

The said spring in addition to supporting and transmitting the weight of the casing and contents to the operating handle, also controls the limits of the oscillatory displacement about the end of the handle of the said casing.

The discharge outlet 10 in the casing is conveniently formed in the detachable cap 2 secured to the outer end thereof, the said cap being detachably secured on the casing end by any suitable means, such as a bayonet connection or frictionally.

The said discharge outlet is formed centrally in the cap end and communicates with a filter holding tube 11 secured to the inner face of the cap and projecting, when the cap is in position, about one and a half inches axially into the interior of the casing. The filter holding tube has secured therein the outer open end of a tubular gauze filter 12, which is formed with a closed inner end and extends axially into the interior of the casing for a distance of about two thirds the length thereof.

The casing is charged with the material to be projected by removing the said detachable cap from the outer end thereof, the cap being replaced when the charging has been completed. It is preferable only to half charge the casing so that the charged material is substantially level with the under-surface of the tubular filter when the casing is horizontal.

The said tubular gauze filter is kept free from clogging and ensures a controlled fineness of projected powder by the operation of the bellows which alternately draw air through the discharge outlet and the filter and project powder through the filter and the discharge outlet.

The said filter tube being removable with the said detachable cap, can be readily cleared should it become choked.

I claim:

1. A device for projecting pulverised materials comprising a hollow cylindrical casing closed at one end with a delivery aperture therein and open at its other end, a cylindrical bellows connected to the open end of said casing and communicating therewith, a handle secured to the other end of the bellows for oscillating said casing whereby said bellows is compressed and extended to force air through the casing and to force the pulverised material through said delivery aperture, and a spring member having one end secured to the handle and its other end to the casing for supporting the weight of the casing with its contents and for controlling the oscillatory displacement of the casing.

2. A device for projecting pulverised materials comprising a hollow cylindrical casing having one end open and the other end closed with a discharge opening in the closed end, a cylindrical bellows having one end secured to the open end of the casing, a disc member secured to and closing the other end of the bellows, a flat elongated handle member fixed to the disc member and disposed at an angle to the axis of said disc member, and a bowed leaf spring having one end fixed to the handle member adjacent the disc member and having its other end fixed to the outer surface of the casing at a point substantially midway its ends, said spring being disposed in the plane of the handle member and forming an extension thereof for yieldably supporting the casing and bellows in axial alignment and for controlling the movements of said casing and bellows.

3. A device for projecting pulverized materials comprising a casing with a delivery aperture which casing at one end is connected to and communicates with one end of a bellows, the other end of the bellows being secured to an operating handle about which the casing is oscillated to compress and extend the bellows to force air through the casing to effect the projection of the pulverized material from said delivery aperture, and a leaf spring secured to said casing and said handle whereby the oscillatory movement of said casing is controlled, said leaf spring being of curved form.

ALBERT MILTON LEE.

REFERENCES CITED

The following references are of record in the file of this patent:

UNITED STATES PATENTS

| Number | Name | Date |
|---|---|---|
| 691,909 | Manning | Jan. 28, 1902 |
| 1,572,684 | Rhodes | Feb. 9, 1926 |

FOREIGN PATENTS

| Number | Country | Date |
|---|---|---|
| 413,766 | France | Feb. 18, 1911 |
| 595,832 | France | Oct. 9, 1925 |
| 35,194 | France | Dec. 17, 1929 |